(12) United States Patent
Wall

(10) Patent No.: US 6,629,064 B1
(45) Date of Patent: Sep. 30, 2003

(54) APPARATUS AND METHOD FOR DISTORTION COMPENSATION

(75) Inventor: Simon Wall, Thousand Oaks, CA (US)

(73) Assignee: Capstone Turbine Corporation, Chatsworth, CA (US)

(*) Notice: Subject to any disclaimer, the term of this patent is extended or adjusted under 35 U.S.C. 154(b) by 0 days.

(21) Appl. No.: 09/265,729

(22) Filed: Mar. 9, 1999

(51) Int. Cl.[7] .............................................. H04B 15/00
(52) U.S. Cl. ................................................... 702/191
(58) Field of Search ........................ 702/191; 323/266; 343/113; 363/41, 37; 315/291; 318/599, 805; 700/66

(56) References Cited

U.S. PATENT DOCUMENTS

| | | | | |
|---|---|---|---|---|
| 3,889,267 A | * | 6/1975 | Lucas et al. | 342/424 |
| 4,370,749 A | * | 1/1983 | Levy et al. | 375/346 |
| 4,597,037 A | | 6/1986 | Okado | 363/41 |
| 4,937,720 A | * | 6/1990 | Kirchberg | 363/35 |
| 5,099,408 A | | 3/1992 | Chen et al. | 363/41 |
| 5,184,578 A | * | 2/1993 | Quinn et al. | 123/90.17 |
| 5,206,802 A | | 4/1993 | Blasko | 363/41 |
| 5,438,694 A | | 8/1995 | Muri et al. | 455/341 |
| 5,450,306 A | | 9/1995 | Garces et al. | 363/41 |
| 5,550,450 A | | 8/1996 | Palko et al. | 318/800 |
| 5,576,614 A | * | 11/1996 | Meads et al. | 323/239 |
| 5,602,463 A | * | 2/1997 | Bendall et al. | 323/266 |
| 5,715,160 A | * | 2/1998 | Plotke | 700/66 |
| 5,764,024 A | * | 6/1998 | Wilson | 318/805 |
| 5,850,132 A | * | 12/1998 | Garces | 318/599 |
| 5,867,380 A | | 2/1999 | Lee | 363/98 |
| 5,872,710 A | | 2/1999 | Kameyama | 363/95 |
| 6,009,003 A | * | 12/1999 | Yeo | 363/37 |
| 6,137,238 A | * | 10/2000 | Alvarez et al. | 315/199 |

\* cited by examiner

*Primary Examiner*—John Barlow
*Assistant Examiner*—Tung Lau
(74) *Attorney, Agent, or Firm*—Sterne, Kessler, Goldstein and Fox P.L.L.C.

(57) ABSTRACT

Distortion compensation controller reduces harmonic distortion in an AC circuit current and/or voltage of a power converter bridge operating under digital current and/or voltage control. Within distortion compensation controller, an array of memory locations are used, each corresponding to a particular angle range in the AC cycle. Enough memory locations are allocated to cover all of the AC cycle. For each of these memory locations, historical information is collected over a number of AC cycles about the distortion measured during the corresponding angle range in the AC cycle. Using the historical information, a compensation signal is calculated for use at that angle in the next AC cycle. As the AC cycle progresses, the appropriate compensation signal is added to the output of a conventional current controller. In this way, a near perfect sinusoid can be achieved in the steady state for the current/voltage waveform in the AC circuit.

136 Claims, 7 Drawing Sheets

APPARATUS AND METHOD FOR DISTORTION COMPENSATION

BACKGROUND OF THE INVENTION

1. Field of the Invention

This invention relates generally to power conversion and generation systems and particularly to distortion compensation algorithms.

2. Description of the Prior Art

Power electronic inverter bridges are widely used to convert power between Ac and DC circuits. To match the AC and DC circuits, the inverter bridge has generally one leg for each phase. The legs are made up of two electronic switches. One switch is connected to the positive DC line and the AC line. The other switch is connected to the negative DC line and the AG line. Using the two switches, the AC line is alternately connected to the positive and negative De lines. In this way, power transfer can be achieved.

When both switches are on at the same time, the positive and negative DC lines become connected, causing a high current, which can be detrimental to the circuit, to flow. It is thus very important that both switches never be on at the same time. To prevent this situation, a "dead-time" is inserted between the turning off of one switch and the turning on of the other switch. Unfortunately, this dead-time and other non-linearities of the power converter cause distortion of the current and/or voltage in the AC circuit.

Prior art solutions for reducing AC current and/or voltage distortion focus on using high bandwidth feedback control, which suffers from poor rejection of noise on the measurement of current/voltage signals. Also, high bandwidth feedback control is inflexible when realized using analog circuits and expensive when realized using digital circuits. If low bandwidth feedback control is employed to increase flexibility or reduce cost then significant distortion of the AC current/voltage can occur. Some applications can tolerate the resulting distortion in the AC current/voltage, but will suffer a loss of efficiency. Where the AC circuit is the utility grid, the resulting distortion in the AC current/voltage may exceed the appropriate standards. Many of the same problems are present where a power converter is used to connect between two AC circuits with distortion present in either or both of the AC circuits.

What is needed therefore is an effective apparatus and method for reducing harmonic distortion in AC circuits.

SUMMARY OF THE INVENTION

The present invention provides, in a first aspect, a method for reducing distortion in an electrical quantity in a circuit, including the steps of measuring values of the electrical quantity, sampling the electrical quantity at fixed instants in time, determining a phase angle of the circuit at each sampling, storing historical information about differences between the measured values and corresponding reference values of the electrical quantity throughout a cycle of the electrical quantity, and applying feedback control based upon the historical information and the phase angle for forcing the measured electrical quantities to converge towards the reference electrical quantities.

The present invention provides, in a second aspect, an apparatus for reducing distortion in an electrical quantity in a circuit, including means for measuring values of the electrical quantity, means for sampling the electrical quantity at fixed instants in time; means for determining a phase angle of the circuit at each sampling, a memory for storing historical information about differences between the measured values and corresponding reference values of the electrical quantity throughout a cycle of the electrical quantity, and means for applying feedback control based upon the historical information and the phase angle for forcing the measured electrical quantities to converge towards the reference electrical quantities.

The present invention provides, in a third aspect, a method for reducing distortion in an electrical quantity in a circuit, including the steps of measuring values of the electrical quantity, sampling the electrical quantity at fixed instants in time, determining a phase angle of the circuit at each sampling, storing historical information about differences between the measured values and corresponding reference values of the electrical quantity throughout a cycle of the electrical quantity, allocating memory locations capable of storing a fixed number of values to cover all of the cycle, and applying feedback control based upon the historical information and the phase angle for forcing the measured electrical quantities to converge towards the reference electrical quantities.

The present invention provides, in a fourth aspect, an apparatus for reducing distortion in an electrical quantity in a circuit, including means for measuring values of the electrical quantity, means for sampling the electrical quantity at fixed instants in time, means for determining a phase angle of the circuit at each sampling, means for storing historical information about differences between the measured values and corresponding reference values of the electrical quantity throughout a cycle of the electrical quantity, means for allocating memory locations to cover all of the cycle, wherein the memory locations are capable of storing a fixed number of values, and means for applying feedback control based upon the historical information and the phase angle for forcing the measured electrical quantities to converge towards the reference electrical quantities.

The present invention provides, in a fifth aspect, a method for reducing harmonic distortion in a current/voltage of an AC circuit of a power converter bridge operating under digital current/voltage control, including the steps of measuring values of the AC circuit current/voltage, sampling the AC circuit current/voltage at fixed instants in time, determining a phase angle of the circuit at each sampling, storing historical information about differences between the measured values and corresponding reference values of the AC current/voltage throughout a cycle of the AC circuit current/voltage, allocating memory locations to cover all of the cycle, wherein the memory locations are capable of storing a fixed number of values and applying feedback control based upon the historical information and the phase angle for forcing the measured currents/voltages to converge towards the reference currents/voltages.

Finally, the present invention provides-an apparatus for reducing distortion in an AC circuit current/voltage in a circuit, including means for measuring values of the AC circuit current/voltage, means for sampling the AC circuit current/voltage at fixed instants in time, means for determining a phase angle of the circuit at each sampling, means for storing historical information about differences between the measured values and corresponding reference values of the AC current/voltage throughout a cycle of the AC circuit current/voltage, means for allocating memory locations to cover all of the cycle, wherein the memory locations are capable of storing a fixed number of values, and means for applying feedback control based upon the historical information and the phase angle for forcing the measured currents/voltages to converge towards the reference currents/voltages.

These and other features and advantages of this invention will become further apparent from the detailed description and accompanying figures that follow. In the figures and description, numerals indicate the various features of the invention, like numerals referring to like features throughout both the drawing figures and the written description.

DETAILED DESCRIPTION OF THE PREFERRED EMBODIMENT(S)

Figure 1:
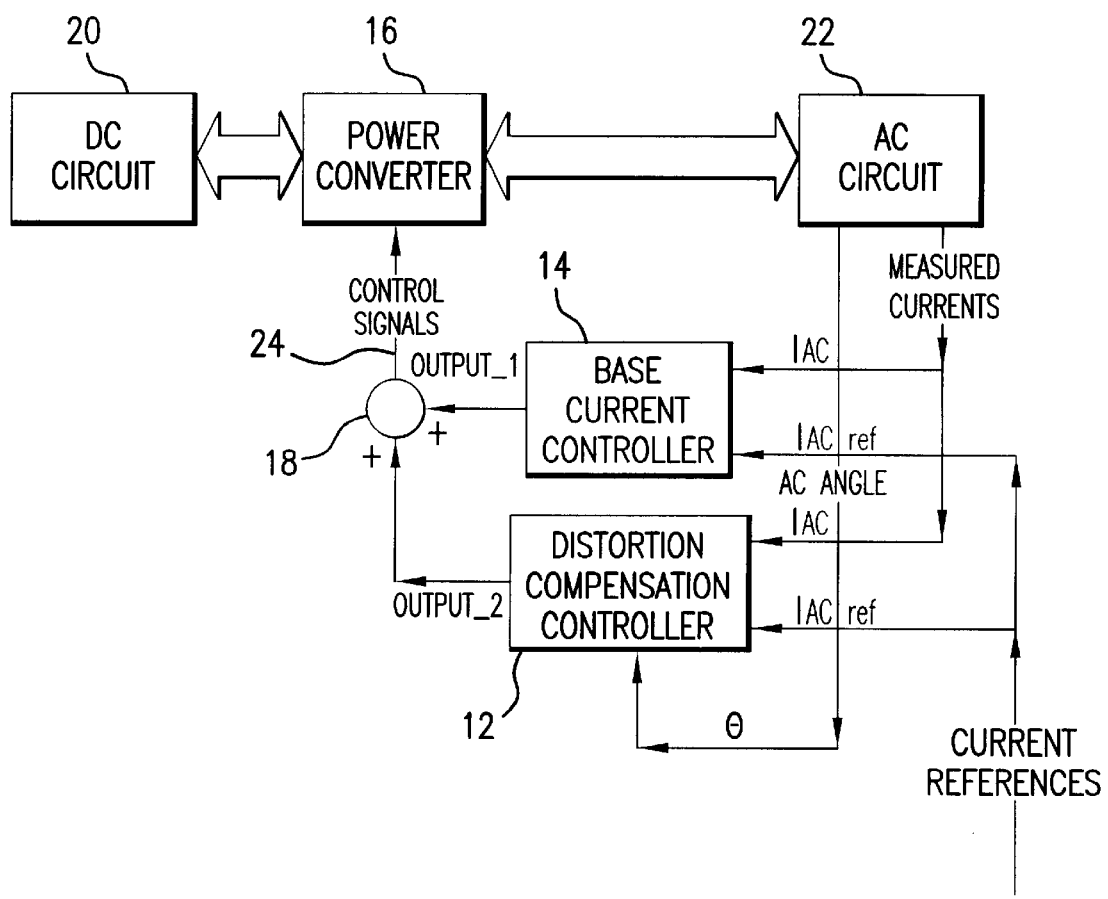
FIG. 1 is a block diagram of a controller including a base current controller and distortion compensation controller according to the present invention.

Referring to FIG. 1, distortion compensation controller 12 reduces harmonic distortion in an AC circuit current 22 of a power converter bridge operating under digital current control. Within distortion compensation controller 12, an array of memory locations 28 (FIG. 2(a)) are used, each corresponding to a particular angle range in the AC cycle. Enough memory locations are allocated to cover all of the AC cycle. For each of these memory locations, historical information is collected over a number of AC cycles about the distortion measured during the corresponding angle range in the AC cycle. Using the historical information, a compensation signal is calculated for use at that angle in the next AC cycle. As the AC cycle progresses, the appropriate compensation signal is added to the output of the existing current controller. In this way, a near perfect sinusoid can be achieved in the steady state for the current waveform in the AC circuit.

One skilled in the art will recognize that the particular configurations shown herein are for illustrative purposes only. In particular, the present invention is not limited to use with power controllers, but rather may be utilized anywhere where reducing harmonic distortion is desirable.

Referring to FIG. 1, distortion compensation controller 12 is preferably implemented as an algorithm designed to operate in a controller 10, such as a discrete-time digital controller, that is used to provide control signals for a power electronic inverter. Alternatively, distortion compensation controller 12 can be implemented in a software and hardware configuration or as a hardware, configuration alone.

Controller 10 includes distortion compensation controller 12, base current controller 14, power converter 16 and combiner 18. Power converter 16 may be a bi-directional switching converter configured, under the control of power controller 10, to provide for conversion between DC circuit 20 and AC circuit 22. Power converter 16 may be capable of operating in a forward or reverse direction. In a typical implementation, power converter 16 provides for the power conversions that take place between a turbine (not shown) and load/utility grid (not shown). In a discrete-time system, the quantity to be controlled is sampled regularly at fixed instants in time. The time interval between samples will be denoted $T_s$. For illustrative purposes, the quantity to be controlled is current from AC circuit 22. This can be the directly measured current or some related quantity formed by fixed or time varying transformations.

After each sample point, the controlled current $I_{AC}$ is compared with a reference current $I_{AC\_ref}$. The primary control algorithm used to regulate the current in AC circuit 22 is implemented in base current controller 14. In particular, a feedback algorithm is implemented In base current controller 14, which calculates appropriate control signals for power converter 16 to ensure that the controlled current converges towards the reference in the steady-state.

In accordance with the present invention, distortion compensation controller 12 augments the action of base current controller 14. One skilled in the art will recognize that many realizations are possible for base current controller 14, all of which are suitable for augmentation by distortion compensation controller 12. In particular, the distortion compensation controller 12 can be implemented as a feedback algorithm in controller 10 which uses the same values of controlled current $I_{AC}$ and reference current $I_{AC\_ref}$ as base current controller 14.

Referring to FIG. 1, AC circuit controlled current (sampled every $T_s$ period) $I_{AC}$, AC circuit reference current $I_{AC\_ref}$, and AC circuit phase angle (sampled or estimated every $T_s$ period) θ or monotonic function of the circuit phase angle g(θ) are applied to distortion compensation controller 12. Thus, in addition to controlled current $I_{AC}$ and reference current $I_{AC\_ref}$, distortion compensation controller 12 also requires a measurement or estimation of the phase angle θ of AC circuit 22 at each sample point. The output from distortion compensation controller 12, denoted Output _2, is combined with the output from base current controller 14, denoted Output _1, in combiner 18. Combiner 18 generates control signals 24 that are applied to power converter 16. Distortion compensation controller 12 thus applies feedback control to force the measured AC current $I_{AC}$ to converge towards reference current $I_{AC\_ref}$. Generally, at start up or after some transient condition, it may take a number of AC cycles for the distortion compensator to converge. Consequently, during the convergence process, the AC current waveforms may be distorted. This is not important as standards regulating the harmonic current content apply to the steady state.

Figure 2A:
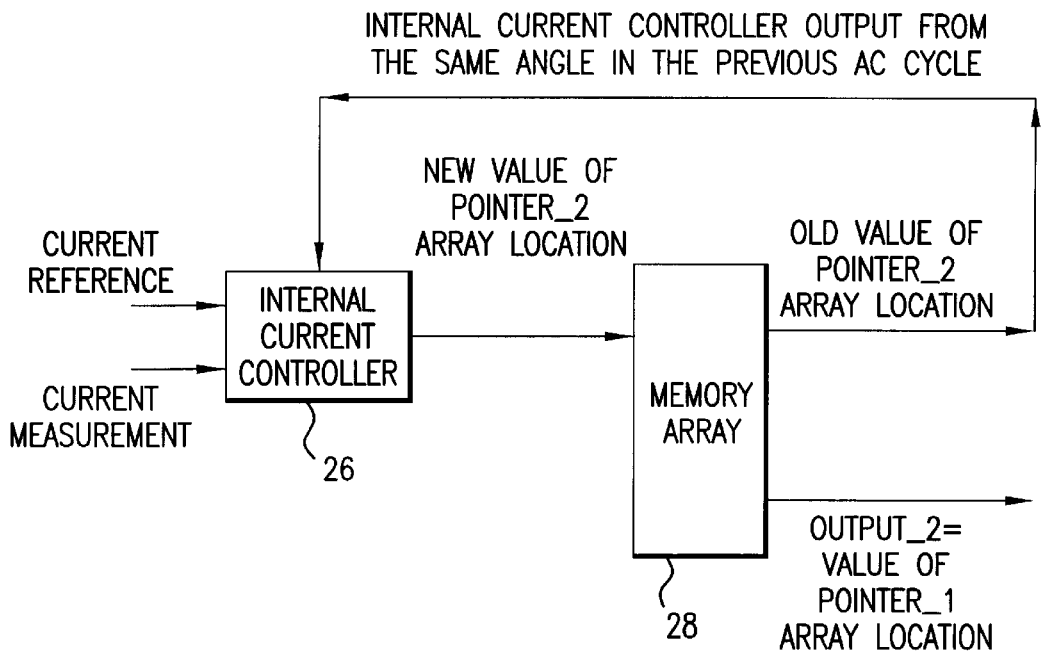
FIG. 2(a) is a detailed block diagram of the distortion compensation controller including an internal current controller illustrated in FIG. 1.

Referring to FIGS. 1 and 2(a), distortion compensation controller 12 includes internal current controller 26 that communicates with memory array 28, which can be conveniently located in controller 10. Internal current controller 26 may have a similar structure to a conventional current controller, in that it will store historical information about the error between reference current $I_{AC\_ref}$ and measured current $I_{AC}$ values. However, where a conventional current controller would use fixed memory storage locations, distortion compensation controller 12 uses memory array 28 addressed according to the phase angle of AC circuit 22.

Each memory location in memory array 28 corresponds to the information gathered about current distortion in a particular angle range of the AC cycle of AC circuit 22. Enough memory locations are allocated in memory array 28 to cover the complete AC cycle from 0 to 2 pi radians.

Figure 2B:
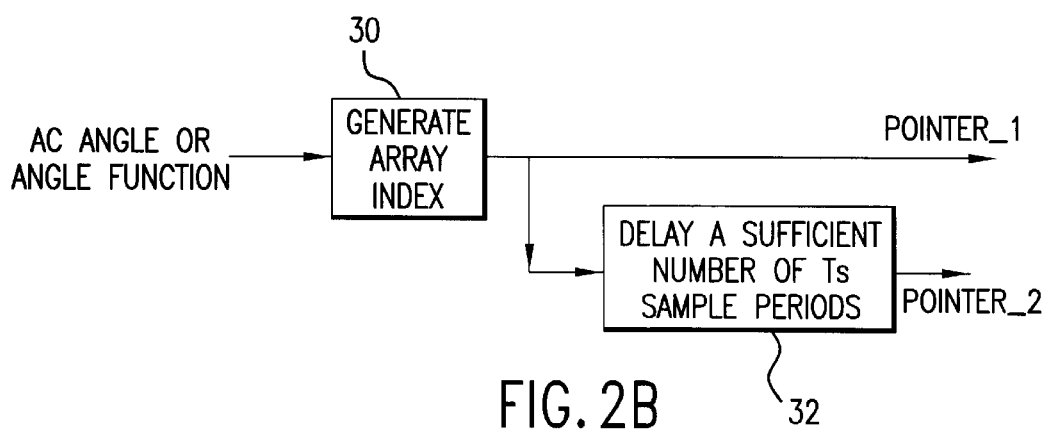
FIG. 2(b) is a diagram of the pointer variables that are calculated by the distortion compensation controller illustrated in FIG. 2(a).

As is illustrated in FIGS. 1, 2(a) and 2(b), two pointer variables; Pointer_1 and Pointer_2, are used to keep track of the angle ranges of interest. These variables hold the address of the memory location that corresponds to the angle range of interest. In particular, based upon the AC angle or angle function from AC circuit 22, an array index 30, denoted Pointer_1, for memory 28 is generated. Pointer_2 corresponds to the angle range of the AC cycle at the point when the latest current sample was taken. Pointer_1 corresponds to the angle range of the AC cycle when the control signals 24 that will be sent to the power converter 16, after the current control algorithms have finished execution in this $T_s$ period, have had time to affect the current in the AC circuit 22.

In particular, Pointer_1 is evaluated as a function of the AC angle. The function is such that at the start of the AC cycle the pointer addresses the first memory location in the array. Then as the AC cycle progresses, each element covering angle ranges from 0 to 2 pi radians is addressed once and in order. At the beginning of the next AC cycle, Pointer_1 once again addresses the first memory, location in the array. Pointer_2 follows Pointer_1 with a delay angle that reflects the time delays associated with the current sampling process, the controller calculations, and the response time of power converter 16 and AC circuit 22.

In accordance with another embodiment of the invention, distortion compensation controller 12 can be used to control each phase of AC circuit 22. In such a configuration, a separate distortion compensation controller 12 is required for each phase of AC circuit 22 in which the current can be controlled independently.

One skilled in the art will recognize that distortion compensation controller 12 can be implemented with many different internal current controller algorithms. If the chosen implementation requires more than one memory storage location then a separate memory array may be required for each.

Figure 3:
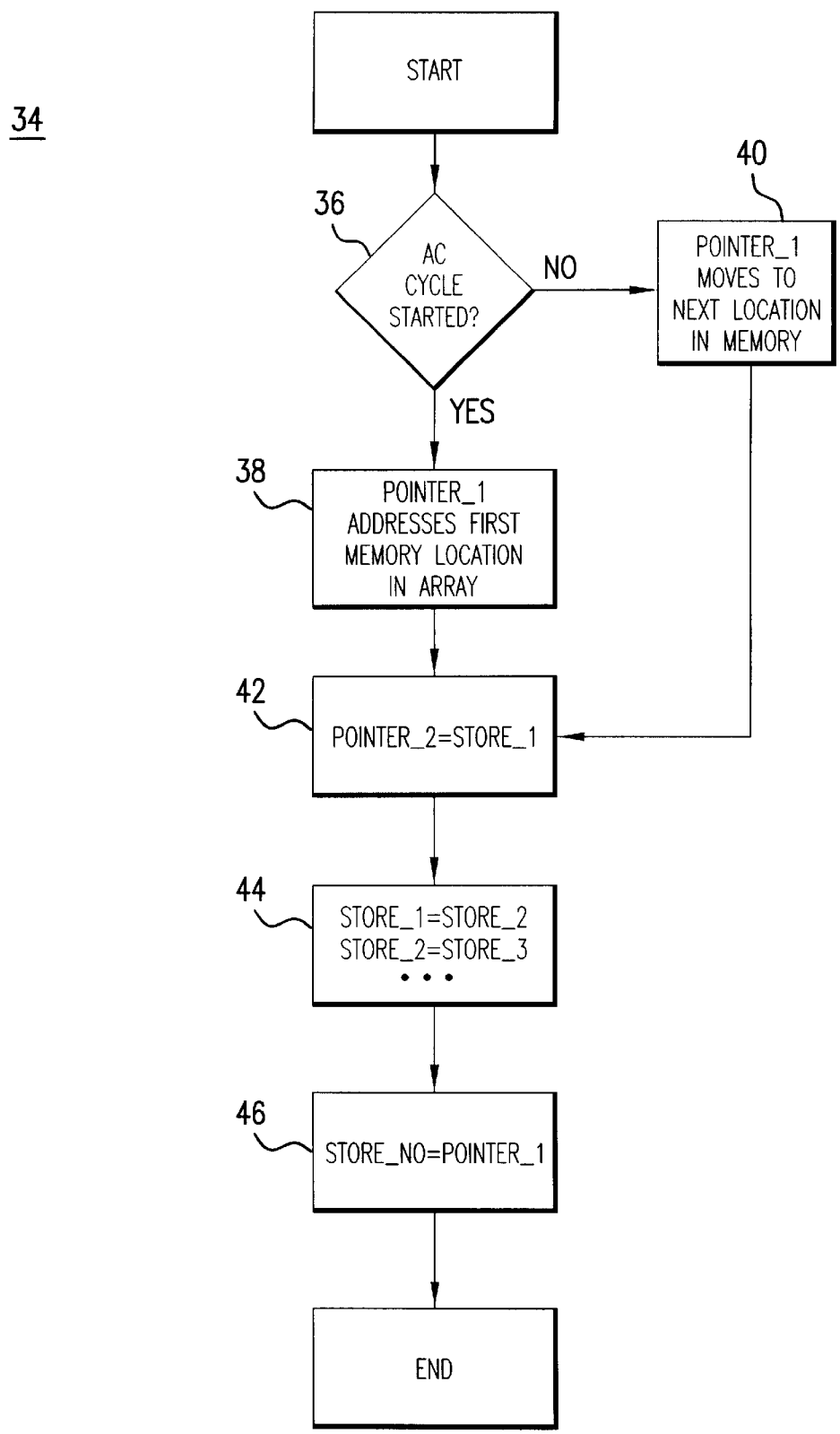
FIG. 3 is a flowchart of an algorithm for calculating pointer values for the distortion compensation controller illustrated in FIG. 2(a).

Referring to FIG. 3, a flowchart of an algorithm 34 for determining a pointer calculation for a system with near constant AC frequency, executed in each $T_s$ period, is illustrated. The required delay between Pointer_1 and Pointer_2 is approximated by $(N_d +1) T_s$. In addition to the memory array, $N_d$ further memory locations are required for use in calculating Pointer_2 from Pointer_1. These memory locations are denoted Store_1 to Store_$N_d$. If a new AC cycle has started (step 36), Pointer_1 addresses the first memory location in the array (step. 38). If a new AC cycle has not started (step 36), Pointer_1 moves onto the next memory location in the array (step 40). Pointer_2 is then set to equal memory location Store_1 (step 42). Memory location Store_1 is then set to equal memory location Store_2, memory location Store_2 is then set to equal memory location Store_3 and so forth (step 44). Memory location Store_$N_d$ is; then set to Pointer_1 (step 46).

Figure 4:
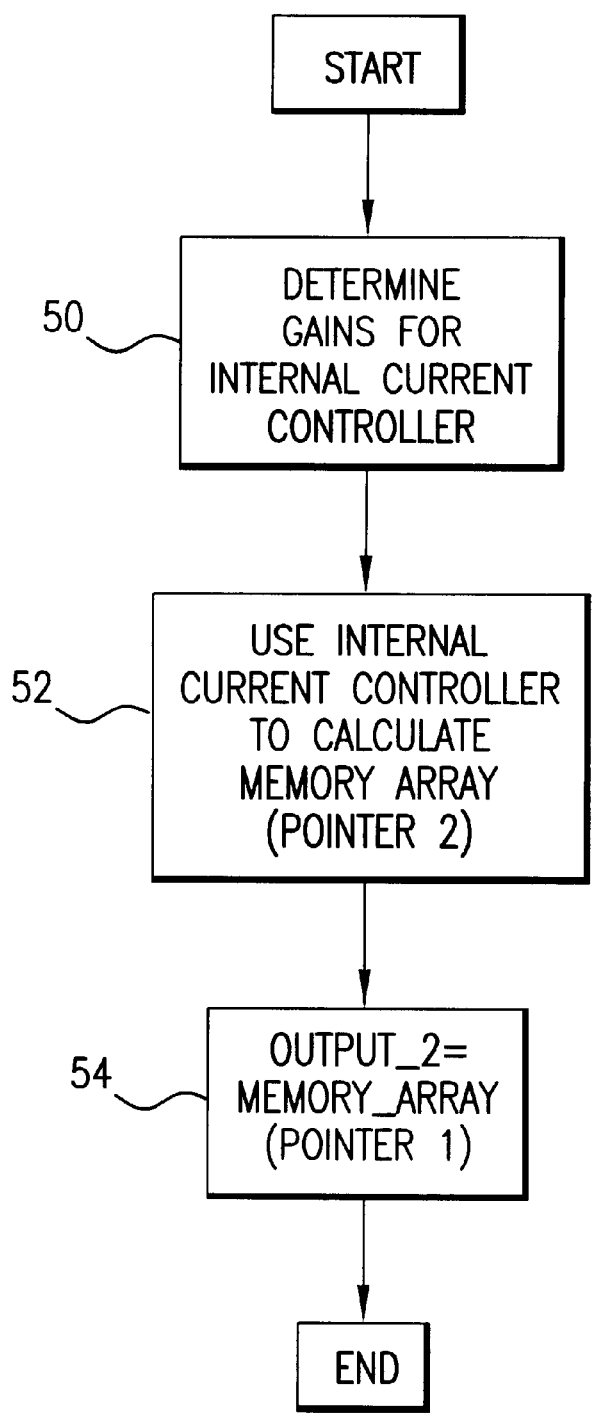
FIG. 4 is a flowchart of an algorithm for the internal current controller in the distortion compensation controller illustrated in FIG. 2(a).

Referring to FIGS. 1, 2(a) and 4, a flowchart of an algorithm 48 for calculating the output (Output_2) from distortion compensation controller 12, executed in each sampling period $T_s$ after evaluation of Pointer_1 and Pointer_2 for the internal current controller 26, is shown. Memory array (Pointer_1) refers to the memory location in memory array 28 that is addressed to Pointer_1. Memory array (Pointer_2) refers to the memory location in memory array 28 that is addressed by Pointer_2. Gain_1 and Gain_2 will be determined based upon various factors, including but not limited to the nature of power converter 16 and AC circuit 22 (step 50). The memory array 28. (Pointer_2) is calculated based (step 52) upon the following equation:

$$\text{Gain\_1} * \text{Memory\_array(Pointer\_2)} + \text{Gain\_2} * (I_{AC\_ref} - I_{AC}) \quad \text{(Eq. 1)}$$

The Output_2 is then set to equal memory_array (Pointer_1) (step 54).

Figure 5:
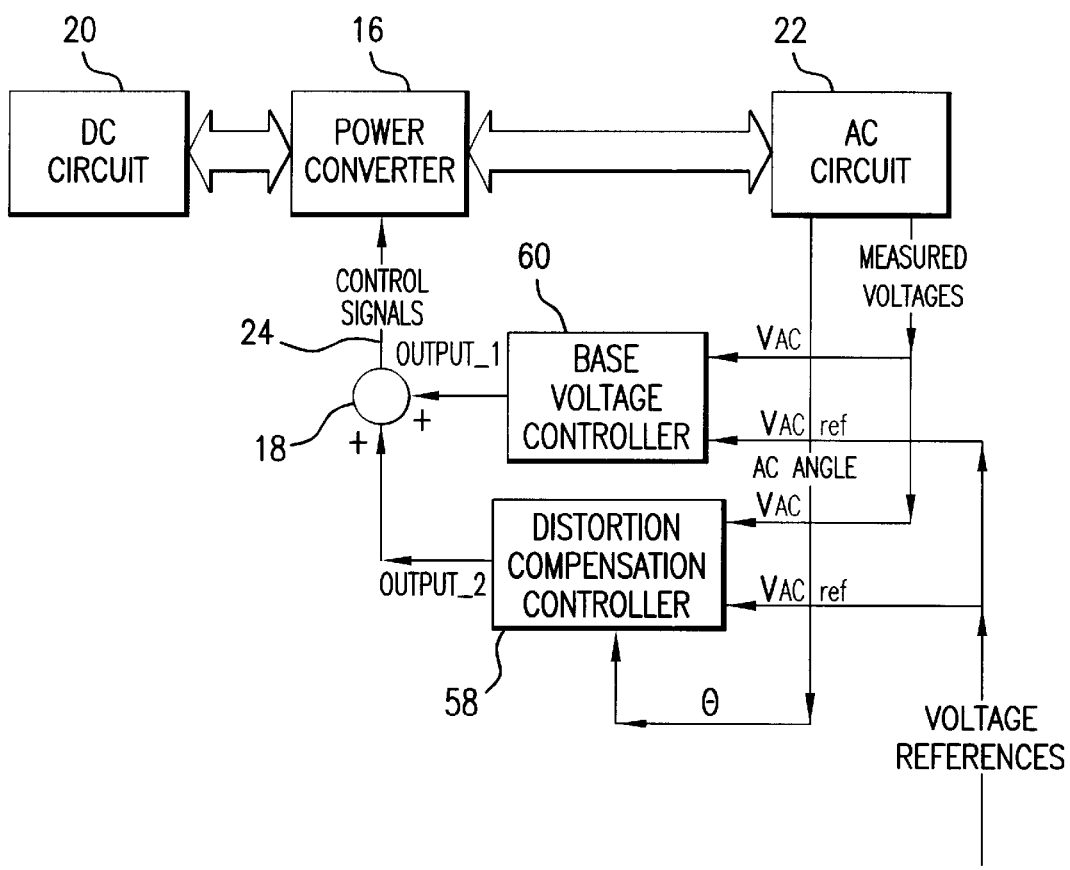
FIG. 5 is a block diagram of a controller including a base voltage controller and distortion compensation controller according to the, present invention.
Figure 6:
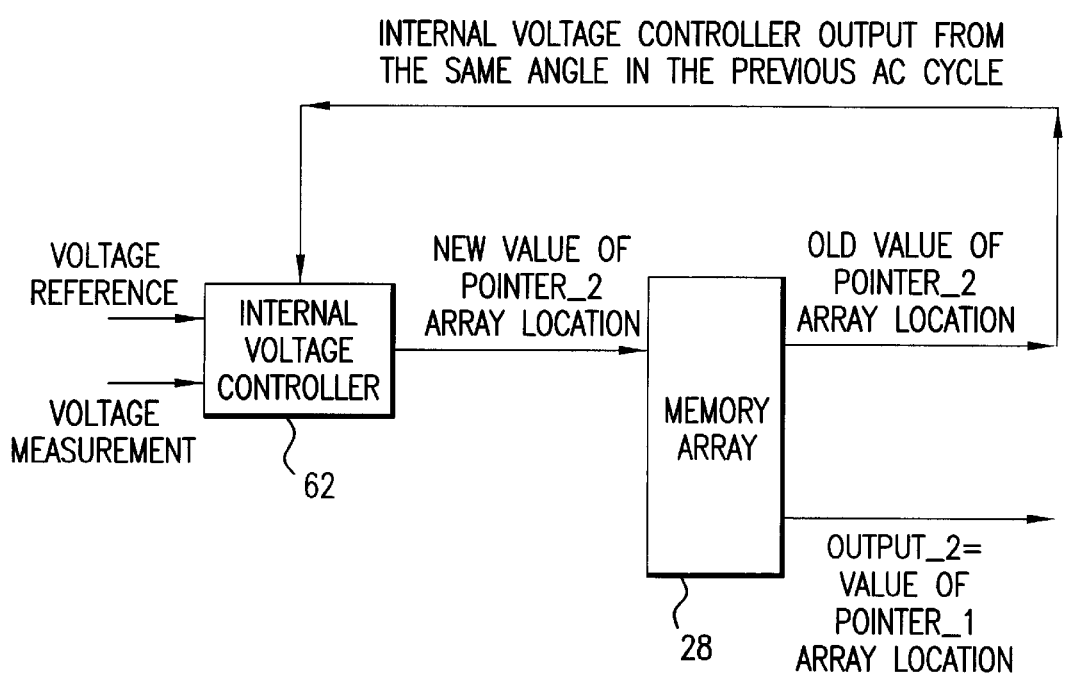
FIG. 6 is a detailed block diagram of the distortion compensation controller including an internal voltage controller illustrated in FIG. 5.
Figure 7:
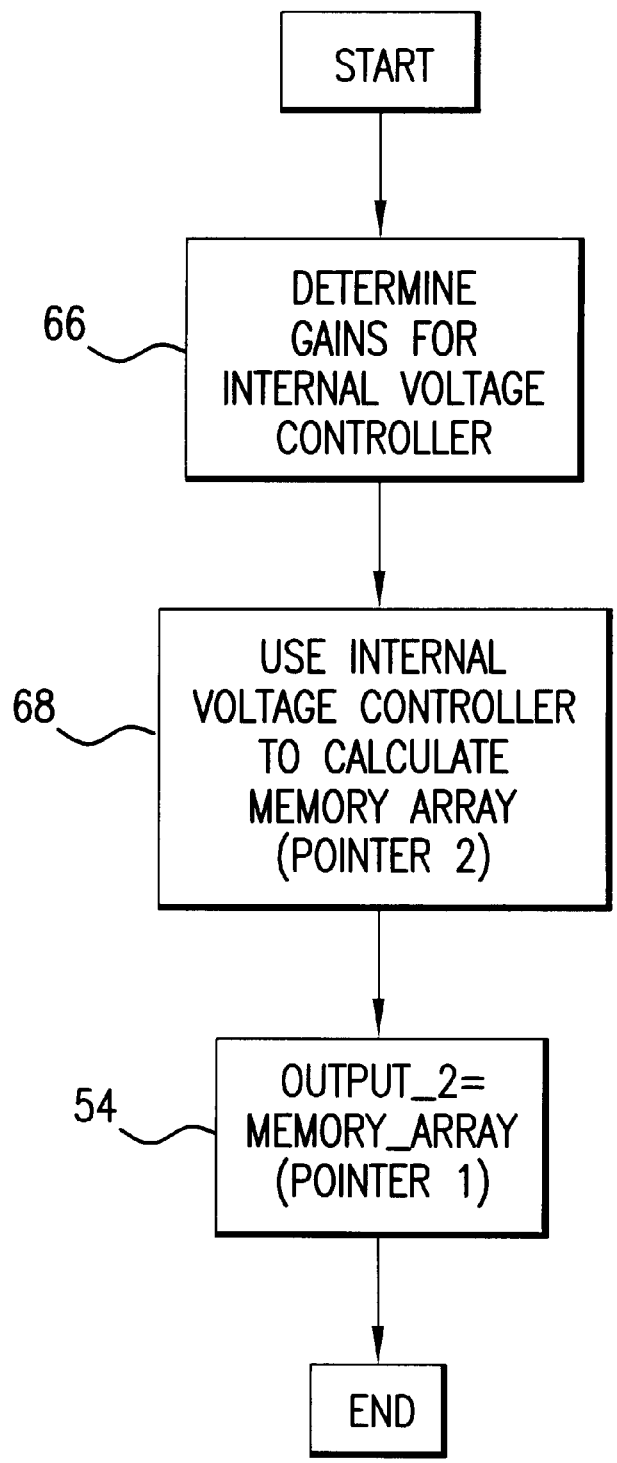
FIG. 7 is a flowchart of an algorithm for the internal voltage controller in the distortion compensation controller illustrated in FIG. 6.

Referring to FIGS. 5 through 7, while the invention has been specifically described in detail with respect to the correction of current distortion, it is equally applicable to the correction of voltage distortion. In such a case, the AC voltage would be measured rather than the current, and the measured AC voltage would be compared to a reference voltage. FIGS. 5 through 7, with the exception of the use of voltage rather than current, thus correspond to FIGS. 1, 2(a) and 4, respectively.

For example, in FIG. 5 controller 56 includes distortion compensation controller 58 and base voltage controller 60. Voltages are measured in AC circuit 22 and inputted with voltage references into base voltage controller (instead of base current controller 14 as shown in FIG. 1) and distortion compensation controller 58. FIG. 5 would otherwise correspond to FIG. 1 in all other respects.

Referring to FIG. 6, distortion compensation controller 58 includes internal voltage controller 62 that communicates with memory array 28. FIG. 6 would otherwise correspond to FIG. 2(a) in all other respects.

Referring to FIGS. 5 through 7, a flowchart of an algorithm 64, similar to the algorithm shown In FIG. 4, for calculating the output (Output_2) from distortion compensation controller 58, executed in each sampling period $T_s$ after evaluation of Pointer_1 and Pointer_2 for the internal voltage controller 62, is shown. Memory array (Pointer_1) refers to the memory location in memory array 28 that is addressed to Pointer_1. Memory_array (Pointer_2) refers to the memory location in memory array 28 that is addressed by Pointer_2. Gain_1 and Gain_2 will be determined based upon various factors, including but not limited to the nature of power converter 16 and AC circuit 22 (step 66). The memory array 28 (Pointer_2) is calculated based (step 68) upon the following equation:

$$\text{Gain\_1} * \text{Memory\_array(Pointer\_2)} + \text{Gain\_2} * (VI_{AC\_ref} - V_{AC}) \quad \text{(Eq. 2)}$$

The Output_2 is then set to equal memory array (Pointer_1) (step 54) as in FIG. 4.

Having now described the invention in accordance with the requirements of the patent statutes, those skilled in this art will understand how to make changes and modifications in the present invention to meet their specific requirements or conditions. For example, the power controller, while described generally, may be implemented in an analog or digital configuration. In the preferred digital configuration, one skilled in the art will recognize that various terms utilized in the invention are generic to both analog and digital configurations of power controller. For example, converter referenced in the present application is a general term that includes inverters. Correspondingly, in a digital implementation of the present invention, an inverter would be utilized. Such changes and modifications may be made without departing from the scope and spirit of the invention as set forth in the following claims.

What is claimed is:

1. A method for reducing distortion in an electrical quantity in a circuit, comprising the steps of:
   measuring values of said electrical quantity;
   sampling said electrical quantity at fixed instances in time;
   determining a phase angle of said circuit at each sampling;
   storing historical information about differences between said measured values and corresponding reference values of said electrical quantity throughout a cycle of said electrical quantity; and
   applying feedback control based upon said historical information and said phase angle for forcing said measured electrical quantities to converge towards said reference electrical quantities
   wherein said step of storing historical information about differences between said measured values and corresponding reference values of said electrical quantity throughout a cycle of said electrical quantity further comprises the step of allocating memory locations to cover all of said cycle.

2. The method claimed in claim 1, wherein said memory locations are capable of storing a fixed number of values.

3. The method claimed in claim 1, wherein said step of allocating memory locations to cover all of said cycle, further comprises the step of:
   using a memory array addressed according to said phase angle of said circuit.

4. The method claimed in claim 3, wherein each of said memory locations in said array corresponds to information gathered about electrical quantity distortion in a particular angle range of said cycle.

5. The method claimed in claim 1, wherein said step of determining a phase angle of said circuit at each sampling further comprises the step of:
   measuring a phase angle of said circuit at each sampling point.

6. The method claimed in claim 1, wherein said step of determining a phase angle of said circuit at each sampling further comprises the step of;
   estimating a phase angle of said circuit at each sampling point.

7. The method claimed in claim 1, wherein said step of determining a phase angle of said circuit at each sampling further comprises the step of:
   tracking said angle ranges of interest using variables.

8. The method claimed in claim 7, wherein said variables hold said address of said memory location that corresponds to said angle ranges of interest.

9. The method claimed in claim 8, wherein said variables comprise a first and second variable.

10. The method claimed in claim 9, wherein said first variable corresponds to said angle range of said cycle when said feedback control affects said electrical quantity in said circuit.

11. The method claimed in claim 9, wherein said second variable corresponds to said angle range of said cycle at a point when a latest sampling is taken.

12. The method claimed in claim 10, further comprising the step of:
   evaluating said first variable as a function of said angle.

13. The method claimed in claim 12, wherein said step of evaluating said first variable as a function of said angle, further comprises the step of:
   said first variable addressing a first memory location in said memory array at a start of said cycle.

14. The method claimed in claim 13, wherein said step of evaluating said first variable as a function of said angle, further comprises the step of:
   said first variable addressing angle memory locations corresponding to all angle ranges from 0 to 2 pi radians as said cycle progresses.

15. The method claimed in claim 14, further comprising the step of:
   said second variable following said first variable with a delay angle imposed that reflects time delays associated with said sampling and with computation and application of said feedback control output.

16. The method claimed in claim 1, wherein said step of measuring values of said electrical quantity, further comprises the step of:
   measuring values of said electrical quantity at particular angle ranges in said cycle.

17. The method claimed in claim 9, wherein said step of storing historical information, further comprises the step of:
   storing, at one of said memory locations that is addressed by said second variable, values derived from previous contents of said memory location.

18. The method claimed in claim 9, wherein said step of storing historical information, further comprises the step of:
   storing, at one of said memory locations that is addressed by said second variable, values derived from said reference electrical quantity.

19. The method claimed in claim 9, wherein said step of storing historical information, further comprises the step of:
   storing, at one of said memory locations that is addressed by said second variable, values derived from said latest sampling of said measured reference electrical quantity.

20. The method claimed in claim 9, wherein said step of applying feedback control further comprises the step of:
   producing a compensation signal that is derived from a value held at one of said memory locations addressed by said first variable.

21. The method claimed in claim 1, wherein said step of applying feedback control, further comprises the step of:
   adding an appropriate compensation signal based upon said historical information to an output of said feedback control used to force said measured electrical quantities to converge towards said reference electrical quantities.

22. The method claimed in claim 1, wherein said electrical quantity is the directly measured electrical quantity.

23. The method claimed in claim 1, wherein said electrical quantity is a related quantity formed by fixed transformations.

24. The method claimed in claim 1, wherein said electrical quantity is a related quantity formed by time varying transformations.

25. The method claimed in claim 1, wherein said step of storing historical information about differences between said measured values and corresponding reference values of said electrical quantity throughout a cycle of said electrical quantity, further comprises the step of:
   comparing said measured values with said reference values of the electrical quantity.

26. The method claimed in claim 1, wherein said electrical quantity comprises current.

27. The method claimed in claim 1, wherein said electrical quantity comprises voltage.

28. An apparatus for reducing distortion in an electrical quantity in a circuit, comprising:

means for measuring values of said electrical quantity;

means for sampling said electrical quantity at fixed instances in time;

means for determining a phase angle of said circuit at each sampling;

a memory for storing historical information about differences between said measured values and corresponding reference values of said electrical quantity throughout a cycle of said electrical quantity; and means for applying feedback control based upon said historical information and said phase angle for forcing said measured electrical quantities to converge towards said reference electrical quantities wherein said memory for storing historical information about differences between said measured values and corresponding reference values of said electrical quantity throughout a cycle of said electrical quantity further comprises means for allocating memory locations to cover all of said cycle.

29. The apparatus claimed in claim 28, wherein said memory locations are capable of storing a fixed number of values.

30. The apparatus claimed in claim 28, wherein said means for allocating memory locations to cover all of said cycle, further comprises:

means for using a memory array addressed according to said phase angle of said circuit.

31. The apparatus claimed in claim 30, wherein each of said memory locations in said array corresponds to information gathered about electrical quantity distortion in a particular angle range of said cycle.

32. The apparatus claimed in claim 28, wherein said means for determining a phase angle of said circuit at each sampling, further comprises:

means for measuring a phase angle of said circuit at each sampling point.

33. The apparatus claimed in claim 28, wherein said means for determining a phase angle of said circuit at each sampling further comprises:

means for estimating a phase angle of said circuit at each sampling point.

34. The apparatus claimed in claim 28, wherein said means for determining a phase angle of said circuit at each sampling, further comprises:

means for tracking said angle ranges of interest using variables.

35. The apparatus claimed in claim 34, wherein said variables hold said address of said memory location that corresponds to said angle ranges of interest.

36. The apparatus claimed in claim 35, wherein said variables comprise a first and second variable.

37. The apparatus claimed in claim 36, wherein said first variable corresponds to said angle range of said cycle when said feedback control affects said electrical quantity in said circuit.

38. The apparatus claimed in claim 36, wherein said second variable corresponds to said angle range of said cycle at a point when a latest sampling is taken.

39. The apparatus claimed in claim 37, further comprising:

means for evaluating said first variable as a function of said angle.

40. The apparatus claimed in claim 39, wherein said means for evaluating said first variable as a function of said angle, further comprises:

means for using said first variable to address a first memory location in said memory array at a start of said cycle.

41. The apparatus claimed in claim 40, wherein said means for evaluating said first variable as a function of said angle, further comprises:

means for using said first variable to address angle memory locations corresponding to all angle ranges from 0 to 2 pi radians as said cycle progresses.

42. The apparatus claimed in claim 41, further comprising:

means for providing said second variable following said first variable with a delay angle imposed that reflects time delays associated with said sampling and with computation and application of said feedback control output.

43. The apparatus claimed in claim 28, wherein said means for measuring values of said electrical quantity, further comprises:

means for measuring values of said electrical quantity at particular angle ranges in said cycle.

44. The apparatus claimed in claim 36, wherein said means for storing historical formation, further, comprises:

means for storing, at one of said memory locations that is addressed by said second variable, values derived from previous contents of said memory location.

45. The apparatus claimed in claim 36, wherein said means for storing historical information, further comprises:

means for storing, at one of said memory locations that is addressed by said second variable, values derived from said reference electrical quantity.

46. The apparatus claimed in claim 36, wherein said means for storing historical information, further comprises:

means for storing, at one of said memory locations that is addressed by said second variable, values derived from said latest sampling of said measured electrical quantity.

47. The apparatus claimed in claim 36, wherein said means for applying feedback control further comprises:

means for producing a compensation signal that is derived from a value held at one of said memory locations addressed by said first variable.

48. The apparatus claimed in claim 28, wherein said means for applying feedback control, further comprises:

means for adding an appropriate compensation signal based upon said historical information to an output of said feedback control used to force said measured electrical quantities to converge towards said reference electrical quantities.

49. The apparatus claimed in claim 28, wherein said electrical quantity is the directly measured electrical quantity.

50. The apparatus claimed in claim 28, wherein said electrical quantity is a related quantity formed by fixed transformations.

51. The apparatus claimed in claim 28, wherein said electrical quantity is a related quantity formed by time varying transformations.

52. The apparatus claimed in claim 28, wherein said means for storing historical information about differences between said measured values and corresponding reference values of said electrical quantity throughout a cycle of said electrical quantity, further comprises:

means for comparing said measured values with said reference values of said electrical quantity.

53. The apparatus claimed in claims 28, wherein said electrical quantity comprises current.

54. The apparatus claimed in claim 28, wherein said electrical quantity comprises voltage.

55. A method for reducing distortion in an electrical quantity in a circuit, comprising the steps of:
  measuring values of said electrical quantity;
  sampling said electrical quantity at fixed instants in time;
  determining a phase angle of said circuit at each sampling;
  storing historical information about differences between said measured values and corresponding reference values of said electrical quantity throughout a cycle of said electrical quantity;
  allocating memory locations capable of storing a fixed number of values to cover all of said cycle; and
  applying feedback control based upon said historical information and said phase angle for forcing said measured electrical quantities to converge towards said reference electrical quantities.

56. The method claimed in claim 55, wherein said step of allocating memory locations to cover all of said cycle, further comprises the step of:
  using a memory array addressed according to said phase angle of said circuit.

57. The method claimed in claim 56, wherein each of said memory locations in said array corresponds to information gathered about electrical quantity distortion in a particular angle range of said cycle.

58. The method claimed in claim 57, wherein said step of determining a phase angle of said circuit at each sampling, further comprises the step of:
  tracking said angle, ranges of interest using variables.

59. The method claimed in claim 58, wherein said variables hold said address of said memory location that corresponds to said angle ranges of interest.

60. The method claimed in claim 59, wherein said variables comprise a first and second variable.

61. The method claimed in claim 60, wherein said first variable corresponds to said angle range of said cycle when said feedback control affects said electrical quantity in said circuit.

62. The method claimed in claim 61, wherein said second variable corresponds to said angle range of said cycle at a point when a latest sampling is taken.

63. The method claimed in claim 62, further comprising the step of:
  evaluating said first variable as a function of said angle.

64. The method claimed in claim 63, wherein said step of evaluating said first variable as a function of said angle, further comprises the step of:
  said first variable addressing a first memory location in said memory array at a start of said cycle.

65. The method claimed in claim 64, wherein said step of evaluating said first variable as a function of said angle, further comprises the step of
  said first variable addressing angle memory locations corresponding to all angle ranges from 0 to 2 pi radians as said cycle progresses.

66. The method claimed in claim 65, further comprising the step of:
  said second variable following said first variable with a delay angle imposed that reflects time delays associated with said sampling and with computation and application of said feedback control output.

67. The method claimed in claims 66, wherein said step of measuring values of said electrical quantity, further comprises the step of:
  measuring values of said electrical quantity at particular angle ranges in said cycle.

68. The method claimed in claim 67, wherein said step of storing historical information further comprises the step of:
  storing, at one of said memory locations that is addressed by said second variable, values derived from previous contents of said memory location.

69. The method claimed in claim 68, wherein said step of storing historical information further comprises the step of:
  storing, at one of said memory locations that is addressed by said second variable, values derived from said reference electrical quantity.

70. The method claimed in claim 69, wherein said step of storing historical information further comprises the step of:
  storing, at one of said memory locations that is addressed by said second variable, values derived from said latest sampling of said measured electrical quantity.

71. The method claimed in claim 70, wherein said step of applying feedback control further comprises the step of:
  producing a compensation signal that is derived from a value held at one of said memory locations addressed by said first variable.

72. The method claimed in claim 71, wherein said step of applying feedback control, further comprises the step of:
  adding an appropriate compensation signal based upon said historical information to an output of said feedback control used to force said measured electrical quantities to converge towards said reference electrical quantities.

73. The method claimed in claim 72, wherein said step of storing historical information about differences between said measured values and corresponding reference values of said electrical quantity throughout a cycle of said electrical quantity, further comprises the step of:
  comparing said measured values with said reference values of said electrical quantity.

74. The method claimed in claims 73, wherein said electrical quantity comprises current.

75. The method claimed in claim 73, wherein said electrical quantity comprises voltage.

76. An apparatus for reducing distortion in an electrical quantity in a circuit, comprising:
  means for measuring values of said electrical quantity;
  means for sampling said electrical quantity at fixed instants in time;
  means for determining a phase angle of said circuit at each sampling;
  means for storing historical information about differences between said measured values and corresponding reference values of said electrical quantity throughout a cycle of said electrical quantity;
  means for allocating memory locations to cover all of said cycle, wherein said memory locations are capable of storing a fixed number of values; and
  means for applying feedback control based upon said historical information and said phase angle for forcing said measured electrical quantities to converge towards said reference electrical quantities.

77. The apparatus claimed m claim 76, wherein said means for allocating memory locations to cover all of said cycle, further comprises:
  means for using a memory array addressed according to said phase angle of said circuit.

78. The apparatus claimed in claim 77, wherein each of said memory locations in said array corresponds to information gathered about electrical quantity distortion in a particular angle range of said cycle.

79. The apparatus claimed in claim 78, wherein said means for determining a phase angle of said circuit at each sampling further comprises:
   means for tracking said angle ranges of interest using variables.

80. The apparatus claimed in claim 79, wherein said variables hold said address of said memory location that corresponds to said angle ranges of interest.

81. The apparatus claimed in claim 80, wherein said variables comprise a first and second variable.

82. The apparatus claimed in claim 81, wherein said first variable corresponds to said angle range of said cycle when said feedback control affects said electrical quantity in said circuit.

83. The apparatus claimed in claim 82, wherein said second variable corresponds to said angle range of said cycle at a point when a latest sampling is taken.

84. The apparatus claimed in claim 83, further comprising:
   means for evaluating said first variable as a function of said angle.

85. The apparatus claimed in claim 84, wherein said means for evaluating said first variable as a function of said angle, further comprises:
   means for using said first variable to address a first memory location in said memory array at a start of said cycle.

86. The apparatus claimed in claim 85, wherein said means for evaluating said first variable as a function of said angle, further comprises:
   means for using said first variable to address angle memory locations corresponding to all angle ranges from 0 to 2 pi radians as said cycle progresses.

87. The apparatus claimed in claim 86, further comprising:
   means for providing said second variable following said first variable with a delay angle imposed that reflects time delays associated with said sampling and with computation and application of said feedback control output.

88. The apparatus claimed in claim 87, wherein said means for measuring values of said electrical quantity, further comprises:
   measuring values of said electrical quantity at particular angle ranges in said cycle.

89. The apparatus claimed in claim 88, wherein said means for storing historical information, further comprises:
   means for storing, at one of said memory locations that is addressed by said second variable, values derived from previous contents of said memory location.

90. The apparatus claimed in claim 89, wherein said means for storing historical information, further comprises:
   means for storing, at one of said memory locations that is addressed by said second variable, values derived from said reference electrical quantity.

91. The apparatus claimed in claim 90, wherein said means for storing historical information, further comprises:
   means for storing, at one of said memory locations that is addressed by said second variable, values derived from said latest sampling of said measured electrical quantity.

92. The apparatus claimed in claim 91, wherein said means for applying feedback control further comprises:
   means for producing a compensation signal that is derived from a value held at one of said memory locations addressed by said first variable.

93. The apparatus claimed in claim 92, wherein said means for applying feedback control, further comprises:
   means for adding an appropriate compensation signal based upon said historical information to an output of said feedback control used to force said measured electrical quantities to converge towards said reference electrical quantities.

94. The apparatus claimed in claim 93, wherein said means for storing historical information about differences between said measured values and corresponding reference values of said electrical quantity throughout a cycle of said electrical quantity, further comprises:
   means for comparing said measured values with said reference values of said electrical quantity.

95. The apparatus claimed in claim 94, wherein said electrical quantity comprises current.

96. The apparatus claimed in claim 95, wherein said electrical quantity comprises voltage.

97. A method for reducing harmonic distortion in a current of an AC circuit of a power converter bridge operating under digital current control, comprising the steps of:
   measuring values of said AC circuit current;
   sampling said AC circuit current at fixed instants in time;
   determining a phase angle of said circuit at each sampling;
   storing historical information about differences between said measured values and corresponding reference values of said AC circuit current throughout a cycle of said AC circuit current;
   allocating memory locations to cover all of said cycle, wherein said memory locations are capable of storing a fixed number of values; and
   applying feedback control based upon said historical information and said phase angle for forcing said measured currents to converge towards said reference currents.

98. The method claimed in claim 97, wherein said step of allocating memory locations to cover all of said cycle, further comprises the step of:
   using a memory array addressed according to said phase angle of said circuit.

99. The method claimed in claim 98, wherein each of said memory locations in said array corresponds to information gathered about AC circuit current distortion in a particular angle range of said cycle.

100. The method claimed in claim 99, wherein said step of determining a phase angle of said circuit at each sampling, further comprises the step of:
   tracking said angle ranges of interest using variables.

101. The method claimed in claim 100, wherein said variables hold said address of said memory location that corresponds to said angle ranges of interest.

102. The method claimed in claim 101, wherein said variables comprise a first and second variable.

103. The method claimed in claim 102, wherein said first variable corresponds to said angle range of said cycle when said feedback control affects said AC circuit current in said circuit.

104. The method claimed in claim 103, wherein said second variable corresponds to said angle range, of said cycle at a point when a latest sampling is taken.

105. The method claimed in claim 104, further comprising the step of:
   evaluating said first variable as a function of said angle.

106. The method claimed in claim 105, wherein said step of evaluating said first variable as a function of said angle, further comprises the step of:

said first variable addressing a first memory location in said memory array at a start of said cycle.

107. The method claimed in claim 106, wherein said step of evaluating said first variable as a function of said angle, further comprises the step of:
said first variable addressing angle memory locations corresponding to all angle ranges from 0 to 2 pi radians as said cycle progresses.

108. The method claimed in claim 107, further comprising the step of:
said second variable following said first variable with a delay angle imposed that reflects time delays associated with said sampling and with computation and application of said feedback control output.

109. The method claimed in claim 108, wherein said step of measuring values of said AC circuit current, further comprises the step of:
measuring values of said AC circuit current at particular angle ranges in said cycle.

110. The method claimed in claim 109, wherein said step of storing said historical information further comprises the step of:
storing, at one of said memory locations that is addressed by said second variable, values derived from previous contents of said memory location.

111. The method claimed in claim 110, wherein said step of storing said historical information further comprises the step of:
storing, at one of said memory locations that is addressed by said second variable, values derived from said reference current.

112. The method claimed in claim 111, wherein said step of storing said historical information further comprises the step of:
storing, at one of said memory locations that is addressed by said second variable, values derived from said latest sampling of said measured current.

113. The method claimed in claim 112, wherein said step of applying feedback control further comprises the step of:
producing a compensation signal that is derived from a value held at one of said memory locations addressed by said first variable.

114. The method claimed in claim 113, wherein said step of applying feedback control further comprises the step of:
adding an appropriate compensation signal based, upon said historical information to an output of said feedback control used to force said measured currents to converge towards said reference currents.

115. The method claimed in claim 114, wherein said step of storing historical information about differences between said measured values and corresponding reference values of said AC circuit current throughout a cycle of said AC circuit current, further comprises the step of:
comparing said measured values with said reference values of said AC circuit current.

116. An apparatus for reducing distortion in an AC circuit current in a circuit, comprising:
means for measuring values of said AC circuit current;
means for sampling said AC circuit current at fixed instants in time;
means for determining a phase angle of said circuit at each sampling;
means for storing historical information about differences between said measured values and corresponding reference values of said AC circuit current throughout a cycle of said AC circuit current;
means for allocating memory locations to cover all of said cycle, wherein said memory locations are capable of storing a fixed number of values; and
means for applying feedback control based upon said historical information and said phase angle for forcing said measured currents to converge towards said reference currents.

117. The apparatus claimed in claim 116, wherein said means for allocating memory locations to cover all of said cycle, further comprises:
means for using a memory array addressed according to said phase angle of said circuit.

118. The apparatus claimed in claim 117, wherein each of said memory locations in said array corresponds to information gathered about AC circuit current distortion in a particular angle range of said cycle.

119. The apparatus claimed in claim 118, wherein said means for determining a phase angle of said circuit at each sampling further comprises:
means for tracking said angle ranges of interest using variables.

120. The apparatus claimed in claim 119, wherein said variables hold said address of said memory location that corresponds to said angle ranges of interest.

121. The apparatus claimed in claim 120, wherein said variables comprise a first and second variable.

122. The apparatus claimed in claim 121, wherein said first variable corresponds to said angle range of said cycle when said feedback control affects said AC circuit current in said circuit.

123. The apparatus claimed in claim 122, wherein said second variable corresponds to said angle range of said cycle at a point when a latest sampling is taken.

124. The apparatus claimed in claim 123, further comprising:
means for evaluating said first variable as a function of said angle.

125. The apparatus claimed in claim 124, wherein said means for evaluating said first variable as a function of said angle, further comprises:
means for using said first variable to address a first memory location in said memory array at a start of said cycle.

126. The apparatus claimed in claim 125, wherein said means for evaluating said first variable as a function of said angle, further comprises:
means for using said first variable to address angle memory locations corresponding to all angle ranges from 0 to 2 pi radians as said cycle progresses.

127. The apparatus claimed in claim 126, further comprising:
means for providing said second variable following said first variable with a delay angle imposed that reflects time delays associated with said sampling and with computation and application of said feedback control output.

128. The apparatus claimed in claim 127, wherein said means for measuring values of said AC circuit current, further comprises:
measuring values of said AC circuit current at particular angle ranges in said cycle.

129. The apparatus claimed in claim 128, wherein said means for storing said historical information further comprises:
means for storing, at one of said memory locations that is addressed by said second variable, values derived from previous contents of said memory location.

130. The apparatus claimed in claim 129, wherein said means for storing said historical information further comprises:

means for storing, at one of said memory locations that is addressed by said second variable, values derived from said reference current.

131. The apparatus claimed in claim 130, wherein said means for storing said historical information further comprises:

means for storing, at one of said memory locations that is addressed by said second variable, values derived from said latest sampling of said measured current.

132. The apparatus claimed in claim 131, wherein said means for applying feedback control further comprises:

means for producing a compensation signal that is derived from a value held at one of said memory locations addressed by said first variable.

133. The apparatus claimed in clam 132, wherein said means for applying feedback control, further comprises:

means for adding an appropriate compensation signal based upon said historical information to an output of said feedback control used to force said measured currents to converge towards said reference currents.

134. The apparatus claimed in claim 133, wherein said means for storing historical information about differences between said measured values and corresponding reference values of said AC circuit current throughout a cycle of said AC circuit current, further comprises:

means for comparing said measured values with said reference values of said AC circuit current.

135. A method for reducing harmonic distortion in a voltage of an AC circuit of a power converter bridge operating under digital voltage control, comprising the steps of:

measuring values of said AC circuit voltage;

sampling said AC circuit voltage at fixed instants in time;

determining a phase angle of said circuit at each sampling;

storing historical information about differences between said measured values and corresponding reference values of said AC circuit voltage throughout a cycle of said AC circuit voltage;

allocating memory locations to cover all of said cycle, wherein said memory locations are capable of storing a fixed number of values; and applying feedback control based upon said historical information and said phase angle for forcing said measured voltages to converge towards said reference voltages.

136. An apparatus for reducing distortion in an AC circuit voltage in a circuit, comprising:

means for measuring values of said AC circuit voltage;

means for sampling said AC circuit voltage at fixed instants in time;

means for determining a phase angle of said circuit at each sampling;

means for storing historical information about differences between said measured values and corresponding reference values of said AC circuit voltage throughout a cycle of said AC circuit voltage;

means for allocating memory locations to cover all of said cycle, wherein said memory locations are capable of storing a fixed number of values; and means for applying feedback control based upon said historical information and said phase angle for forcing said measured voltages to converge towards said reference voltages.

* * * * *